(12) United States Patent
Kella et al.

(10) Patent No.: US 9,742,961 B2
(45) Date of Patent: Aug. 22, 2017

(54) TO CALIBRATE A PRINTER

(71) Applicant: HEWLETT-PACKARD INDIGO BV, Amstelveen (NL)

(72) Inventors: Dror Kella, Nes Ziona (IL); Gideon Amir, Nes Ziona (IL)

(73) Assignee: Hewlett-Packard Indigo B.V., Amstelveen (NL)

( * ) Notice: Subject to any disclaimer, the term of this patent is extended or adjusted under 35 U.S.C. 154(b) by 0 days.

(21) Appl. No.: 15/030,831

(22) PCT Filed: Oct. 25, 2013

(86) PCT No.: PCT/EP2013/072449
§ 371 (c)(1),
(2) Date: Apr. 20, 2016

(87) PCT Pub. No.: WO2015/058817
PCT Pub. Date: Apr. 30, 2015

(65) Prior Publication Data
US 2016/0248941 A1    Aug. 25, 2016

(51) Int. Cl.
H04N 1/60 (2006.01)
G06K 15/02 (2006.01)
G06F 3/12 (2006.01)

(52) U.S. Cl.
CPC ......... H04N 1/6036 (2013.01); G06F 3/1208 (2013.01); G06F 3/1256 (2013.01); G06K 15/027 (2013.01); G06K 15/1878 (2013.01); H04N 1/6044 (2013.01)

(58) Field of Classification Search
CPC .. H04N 1/6036; H04N 1/6044; G06F 3/1208; G06F 3/1256; G06K 15/027; G06K 15/1878
See application file for complete search history.

(56) References Cited

U.S. PATENT DOCUMENTS

| 6,538,770 B1 | 3/2003 | Mestha |
| 7,149,444 B2 | 12/2006 | Tanaka et al. |
| 7,252,360 B2 | 8/2007 | Hersch et al. |
| 7,486,414 B2 | 2/2009 | Arai |

(Continued)

FOREIGN PATENT DOCUMENTS

| WO | WO-2012118480 A1 | 9/2012 |
| WO | WO-2013162987 A2 | 10/2013 |

OTHER PUBLICATIONS

"Techkon the Authority in Print Quality", Aug. 27, 2009, http://www.techkonusa.com/about-techkon/news/press-releases/techkon-announces-spectroedge-in-line-spectrophotometer/.

(Continued)

Primary Examiner — Quang N Vo
(74) Attorney, Agent, or Firm — HP Inc. Patent Department

(57) ABSTRACT

A method to calibrate a printer in which printing of a first print job is controlled. A target color is obtained from a second print job that is to be printed subsequent to the first print job. Printing of the target color obtained from the second print job is controlled while controlling printing of the first print job. An image of the printed target color is received. The printer is calibrated using the printed target color in the received image and the target color obtained from the second print job.

15 Claims, 2 Drawing Sheets

(56) References Cited

U.S. PATENT DOCUMENTS

2005/0248786 A1* 11/2005 Tobie .................. H04N 1/6033
358/1.9
2006/0126137 A1* 6/2006 Coons ................ G03G 15/5062
358/504
2008/0204771 A1 8/2008 Albat et al.

OTHER PUBLICATIONS

G. Bestmann, Standardization in Offset Printing, Feb. 2006, http://www.google.co.in/url?sa=t&rct=j&q=automatic%20color%20calibration%20for%20coming%20job%20strip%20printing%20press&source=web&cd=2&cad=rja&ved=0CC4QFjAB&url=http%3A%2F%2Fwww.heidelberg.com%2Fwww%2Fhtml%2Fen%2Fbinaries%2Ffiles%2Fprinect%2Fprinect_ststandardization_pdf&ei=kCUCUoq-MYyxrgfkvYGQBw&usg=AFQjCNFzgwFLQPholt88kq9v62sjITap7A&bvm=bv.50310824,d.bmk.

\* cited by examiner

TO CALIBRATE A PRINTER

BACKGROUND

Printer apparatus (such as web presses) are usually arranged to print content on media using printing materials (for example, ink or toner). Printer apparatus are usually calibrated in order to ensure that the colors of the printed content match as closely as possible to the colors defined in the print job.

BRIEF DESCRIPTION

Figure 1:
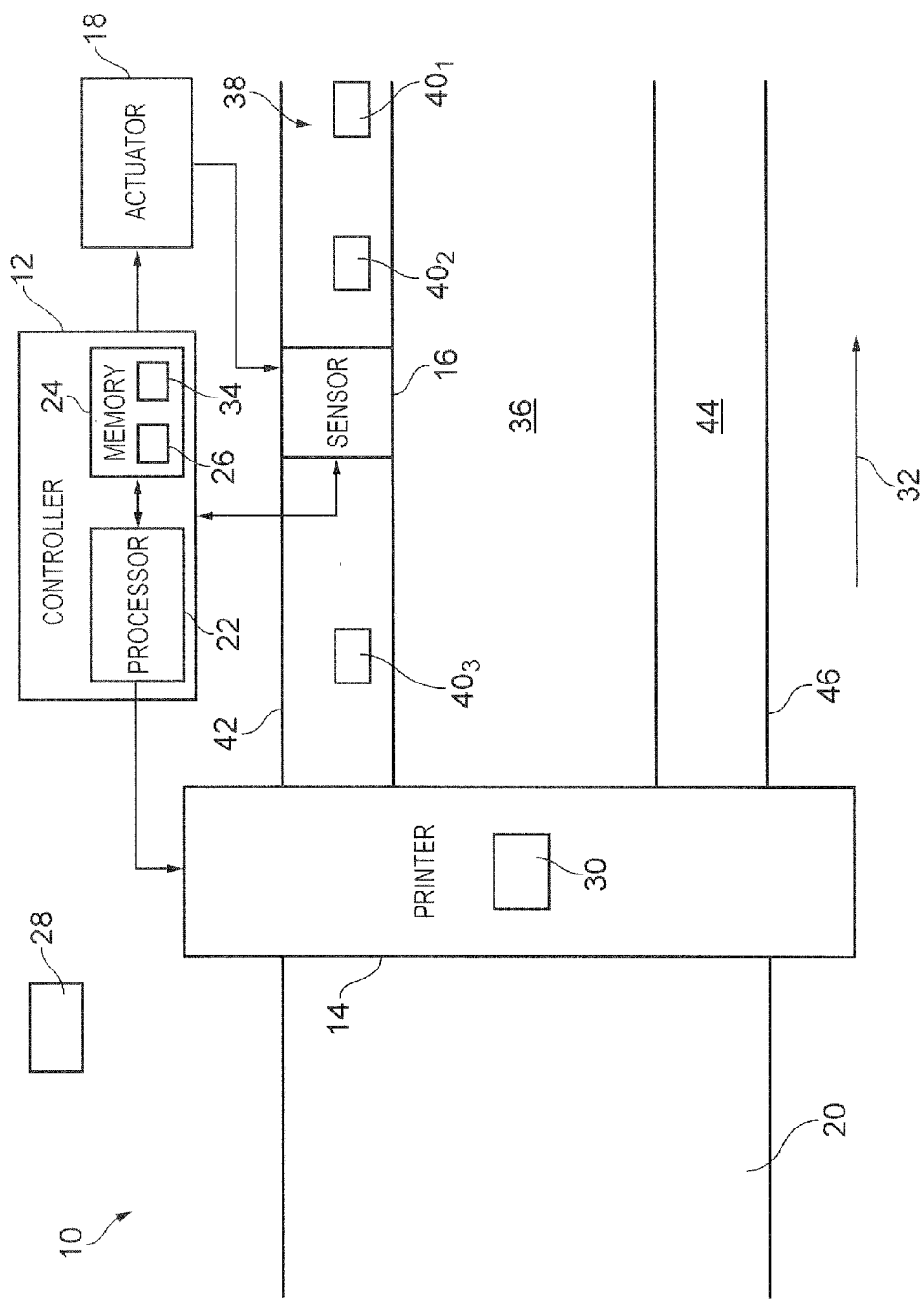
Figure 2:
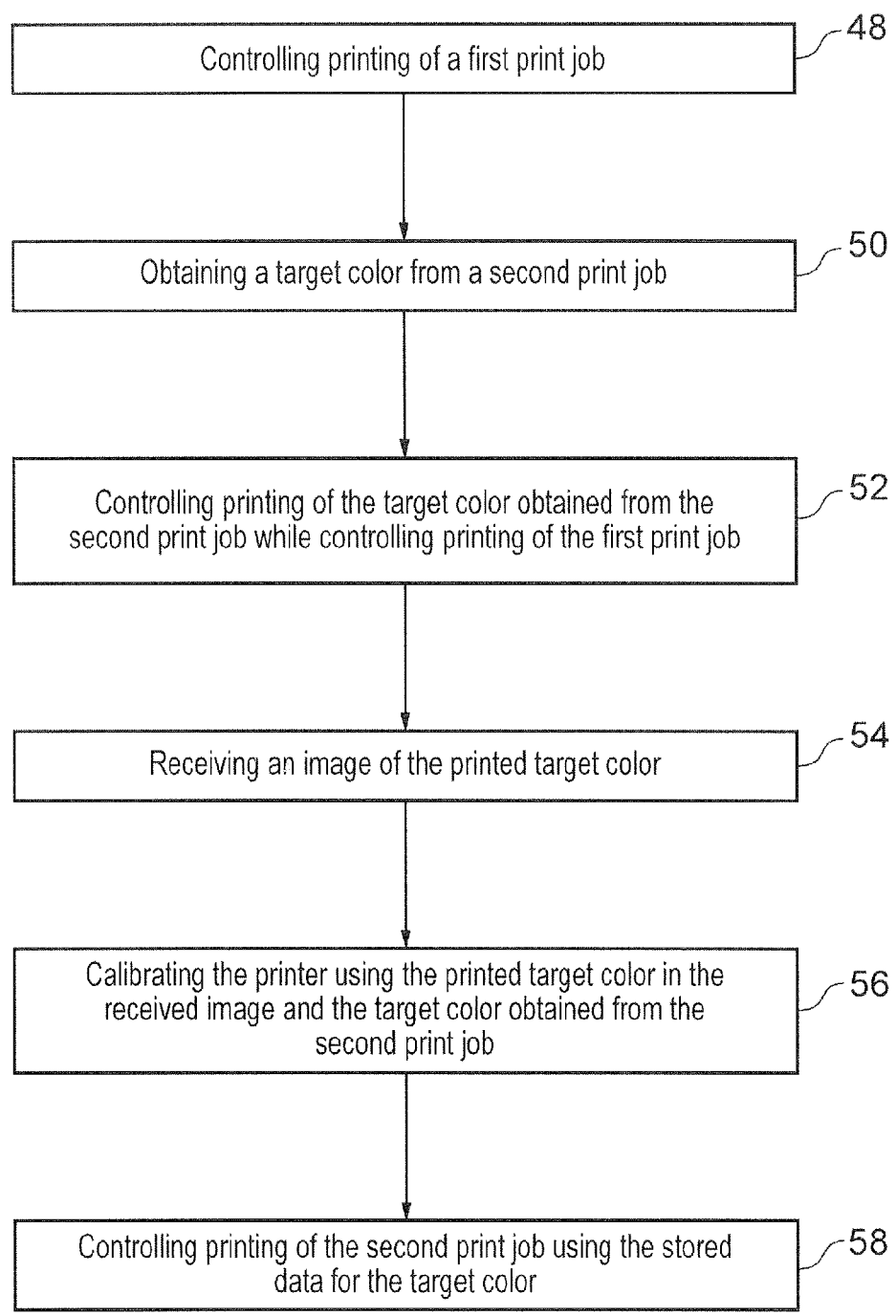

Reference will now be made by way of example only to the accompanying drawings in which:

FIG. 1 illustrates a schematic diagram of printer apparatus according to an example; and FIG. 2 illustrates a flow diagram of a method to calibrate a printer according to an example.

DETAILED DESCRIPTION

FIG. 1 illustrates a schematic diagram of printer apparatus 10 that includes a controller 12, a printer 14, an image sensor 16, and an actuator 18. FIG. 1 also illustrates a sheet or web of media 20. The printer apparatus 10 may be any suitable printer that is arranged to print printing materials onto the media 20. For example, the printer apparatus 10 may be a web press, a sheet fed press, or an inkjet printer. The printer apparatus 10 may be arranged to print color printing materials and/or monochrome (black for example) printing materials.

The printer apparatus 10 may be a module in some examples. As used here 'module' refers to a unit or apparatus that excludes certain parts/components that would be added by an end manufacturer or a user. For example, where the printer apparatus 10 is a module, the printer apparatus 10 may only comprise the controller 12 and the remaining components (namely, the printer 14, the sensor 16, and the actuator 18) may be added by an end manufacturer or a user.

The implementation of the controller 12 can be in hardware alone (for example, circuitry, a processor and so on), have certain aspects in software including firmware alone or can be a combination of hardware and software (including firmware).

The controller 12 may be implemented using instructions that enable hardware functionality, for example, by using executable computer program instructions in a general-purpose or special-purpose processor that may be stored on a computer readable storage medium (disk, memory etc) to be executed by such a processor. Consequently, the controller 12 may include at least one processor 22 and at least one memory 24.

The processor 22 is configured to read from and write to the memory 24. The processor 22 may also comprise an output interface via which data and/or commands are output by the processor 22 and an input interface via which data and/or commands are input to the processor 22.

The memory 24 stores a computer program 26 comprising computer program instructions that control the operation of the printer apparatus 10 when loaded into the processor 22. The computer program instructions 26 provide the logic and routines that enable the apparatus to perform the methods illustrated in FIG. 2 and described in the following paragraphs. By reading the memory 24 the processor 22 is able to load and execute the computer program 26.

The printer apparatus 10 therefore comprises: one or multiple processors 22; and one or multiple memories 24 including computer program code 26, the one or multiple memories 24 and the computer program code 26 configured to, with the one or multiple processors 22, cause the printer apparatus 10 at least to perform the methods illustrated in FIG. 2 and described in the following paragraphs.

The computer program 26 may arrive at the printer apparatus 10 via any suitable delivery mechanism 28. The delivery mechanism 28 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 26. The delivery mechanism 28 may be a signal configured to reliably transfer the computer program 26. The printer apparatus 10 may propagate or transmit the computer program 26 as a computer data signal.

Although the memory 24 is illustrated as a single component, it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) combinations of circuits and software (and/or firmware), such as (as applicable): (i) a combination of processor(s) or (ii) to portions of processor(s)/software (including digital signal processor(s)), software, and memory(ies) that work together to cause an apparatus to perform various functions) and (c) circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware.

The printer 14 may be any suitable printer for providing printing material 30 (such as ink or toner) to the media 20. For example, the printer 14 may be an electrostatic printer or an inkjet printer. In some examples, the printer 14 may be a color printer and include cyan, yellow, magenta and black (CMYK) printing materials 30 for example. In other examples, the printer 14 may be a monochrome printer and only include a single color printing material 30 such as black.

The controller 12 is arranged to receive print jobs from at least one electronic device (a computer for example) and store the print jobs in the memory 24. Consequently, the memory 24 may store a plurality of print jobs at any one time for printing in the future. A print job is a file (or files) that include content (such as images and/or text) that has been submitted for printing.

The controller 12 is arranged to read a print job stored in the memory 24 and control the printer 14 to print the contents of the print job on the media 20 using the printing materials 30. The controller 12 is also arranged to control the printer 14 to move the media 20 in the direction of arrow 32 towards the image sensor 16. For example, the printer 14 may include at least one roller that is arranged to move the media 20 through the printer apparatus 10.

The memory 24 also stores calibration data 34 that associates colors to be printed with combinations of printing materials. For example, where the printing materials are cyan, magenta, yellow and black, the calibration data 34 may include a data entry that associates a printed color red with the magenta and yellow printing materials in equal quantities. By way of another example, the calibration data 34 may include a data entry that associates a printed color green with the cyan and yellow printing materials in equal quantities. The controller 12 is arranged to read the calibration data 34 when executing a print job to ensure that the colors in the print job are accurately printed by the printer 14 on the media 20.

The media 20 may be a web of media or may comprise a plurality of sheets. The media 20 may comprise any suitable material for receiving printing material and may be paper for example. The media 20 includes a first area 36 that comprises at least a portion of the content of the print job being printed. For example, the first area 36 may comprise text and/or images. The media 20 also includes a second area 38 that comprises a plurality of patches 40 of printing material that were printed by the printer 14 when printing the print job. The plurality of patches 40 are illustrated as rectangles in this example, but may have any other shape in other examples. The first area 36 is positioned in the center of the media 20 and the second area 38 is positioned adjacent to the first area 36 and between the first area 36 and a first side edge 42 of the media 20. The media 20 also includes a third area 44 that is positioned adjacent to the first area 36 and between the first area 36 and a second side edge 46 of the media 20.

The image sensor 16 may be any suitable device that is arranged to obtain an image of the media 20. For example, the image sensor 16 may be a spectrophotometer or any other color sensitive device. The image sensor 16 is positioned to overlay the second area 38 of the media 20. The controller 12 is arranged to control the image sensor 16 to obtain an image of at least the second area 38 of the media 20, and to receive the image from the image sensor 16.

The actuator 18 may be any suitable device for moving the image sensor 16 relative to the media 20. For example, the actuator 18 may include a motor. The controller 12 is arranged to control the actuator 18 to move the image sensor 16 relative to the media 20 to a desired location. For example, the controller 12 may control the actuator 18 to move the image sensor 16 perpendicularly to the arrow 32 so that the image sensor 16 overlays the first area 36 of the media 20 or the third area 44 of the media 20. In some examples, the printer apparatus 10 may not include the actuator 18 and consequently, the image sensor 16 is static in these examples.

The operation of the printer apparatus 10 is described in the following paragraphs with reference to FIGS. 1 and 2.

At block 48, the controller 12 reads a first print job from the memory 24 and controls the printer 14 to print the content of the first print job in the first area 36 of the media 20.

At block 50, the controller 12 obtains a target color from a second print job stored in the memory 24. The second print job may be the next scheduled print job to be printed immediately after the first print job. In other examples, the second print job may be any future print job and there may be any number of intervening print jobs between the first print job and the second print job.

The target color may be selected from the second print job as part of a sequence so that the methods illustrated in FIG. 2 and described below may be repeated for all colors, or a subset of colors, within the second print job.

In some examples, the target color may be a color in the second print job that has not been defined for the media 20 on which the second print job will be printed. For example, the media 20 may have a color or surface texture that causes printing of the target color to be inaccurate.

In other examples, the target color may be a shade of gray and the methods illustrated in FIG. 2 and described below may be repeated for other shades of gray.

In further examples, the second print job may be a print job that has been printed previously by the printer apparatus 10 and is scheduled to be printed by the printer apparatus 10 again. The target color may be selected by determining from an image of the previously printed print job, the color or colors that are perceived to be the most important (for example, those colors that are used most within the print job).

At block 52, the controller 12 controls the printer 14 to print the target color obtained from the second print job while controlling the printing of the first print job. In this example, the controller 12 controls the printer 14 to print the content of the first print job in the first area 36 and also controls the printing of the target color in the second area 38 as color patch $40_1$. For example, where the printer 14 is an electrostatic printer, the content of the first print job and the color patch $40_1$ may be printed simultaneously. By way of another example, where the printer 14 is an inkjet printer, the content of the first print job and the color patch $40_1$ may be printed in the same pass of the print head of the inkjet printer over the media 20.

At block 54, the controller 12 controls the image sensor 16 to obtain an image of the printed target color patch $40_1$. In some examples, the controller 12 controls the image sensor 16 to obtain an image after a predetermined period of time has expired since the target color patch $40_1$ was printed. In other examples, the controller 12 may control the image sensor 16 to continuously obtain images. The controller 12 also receives the image of the printed target color patch $40_1$ at block 54. The controller 12 may perform block 54 while controlling printing of the first print job.

At block 56, the controller 12 calibrates the printer 14 using the printed target color patch $40_1$ in the received image and the target color obtained from the second print job. The controller 12 may perform block 56 while controlling printing of the first print job.

In more detail, the controller 12 compares the printed target color patch $40_1$ in the received image with the target color obtained from the second print job and if their similarity exceeds a threshold value, the combination of printing materials 30 for the target color is stored in the memory 24 as calibration data 34.

In some examples, the calibration data 34 may be stored in the memory 24 only after the first print job has been printed. In other examples, the calibration data 34 may be calculated while the first print job is being printed, but is only applied when the second print job is printed. In some examples, the calibration data 34 is stored in the memory 24 for future use as an initial color for the media type and printer apparatus 10 type. In other examples, if a model of a color space exists, the calibration data 34 may be used to modify the color map.

The method may then return to block 50 and a new target color is obtained from the second print job. The method is then repeated for the new target color. Alternatively, the method may end where there are no further target colors in the second print job that require calibration.

If the similarity of the printed target color patch 40₁ and the target color obtained from the second print job does not exceed the threshold value, the method returns to block 52 and is repeated. The controller 12 controls the printer 14 to print the target color patch 40₂ in the second area 38. The printed target color patch 40₂ is formed from a different combination of printing materials 30 to the printed target color patch 40₁. The controller 12 may be arranged to select the combination of printing materials 30 for the target color patch 40₂ using a predetermined variation, or by using a search algorithm.

For example, when attempting to print the target color Bordeaux (RGB: 95, 2, 31) the controller 12 may start with CMYK=0, 0.979, 0.674, 0.627. Since the starting point is only correct for a certain set of inks placed on a certain media the controller 12 will measure the printed output and iterate corrections to the cyan, magenta, yellow and black (CMYK) coverage till the controller 12 measures a value consistent with RGB: 95, 2, 31. In some examples, the controller 12 may measure in red, green and blue (RGB) or be capable of converting to RGB. Alternatively, the target color may be defined in a certain CMYK combination where the controller 12 is capable of converting to CMYK.

At block 54, the controller 12 controls the image sensor 16 to obtain an image of the printed target color patch 40₂ and receives the image from the image sensor 16. At block 56, the controller 12 compares the printed target color patch 40₂ in the received image with the target color obtained from the second print job and if their similarity exceeds a threshold value, the combination of printing materials 30 is stored in the memory 24 as calibration data 34.

If the similarity of the printed target color patch 40₂ and the target color obtained from the second print job does not exceed the threshold value, the method returns to block 52 and is repeated. In particular, the controller 12 controls the printer 14 to print the target color patch 40₃ in the second area 38. The printed target color patch 40₃ is formed from a different combination of printing materials 30 to the printed target color patch 40₁ and to the printed target color patch 40₂. The combination of printing materials 30 that form the printed target color patch 40₃ may be selected as described in the preceding paragraphs.

At block 54, the controller 12 controls the image sensor 16 to obtain an image of the printed target color patch 40₃ and receives the image from the image sensor 16. At block 56, the controller 12 compares the printed target color patch 40₃ in the received image with the target color obtained from the second print job and if their similarity exceeds a threshold value, the combination of printing materials 30 is stored in the memory 24 as calibration data 34. If the similarity of the printed target color patch 40₃ and the target color obtained from the second print job does not exceed the threshold value, the method returns to block 52 and is repeated as described in the preceding paragraphs.

Consequently, the controller 12 determines an optimum combination of printing materials 30 that provide the target color when printed and stores calibration data 34 for the optimum combination of printing materials 30 for the target color. The storage of the calibration data 34 may be a new data entry for the target color in the memory 24, or may be an update to a data entry already existing in the memory 24.

Blocks 48, 50, 52, 54 and 56 may be then be repeated for any number of other target colors within the second print job.

Where there is at least one print job in between the first print job and the second print job (which may be referred to as a third print job), the method illustrated in FIG. 2 may be performed while the printer 14 is printing at least the first print job and then the third print job. In other words, calibration of the colors in the second print job may be performed while the printer 14 is printing any number of intervening print jobs.

The second area 38 and the third area 44 of the media 20 may be removed after the second area 38 has been scanned by the image sensor 16. For example, the printer apparatus 10 may include a cutting device (such as in-line blades for example) for removing the second area 38 and the third area 44 from the first area 36. Consequently, the printed target colors 40 may not form part of the printed output of the first print job from the printer apparatus 10.

At block 58, the controller 12 controls the printer 14 to print the second print job using the stored calibration data 34 for the target color or target colors.

The printer apparatus 10 is advantageous in that colors that are due to be printed in a later print job may be calibrated while printing the current print job or current print jobs. The blocks 48, 50, 52, 54, 56 and 58 may be performed without user intervention and, consequently, the method may be performed automatically by the controller 12. Furthermore, since the target color is printed in the second area 38 of the media, the method may not cause any delay or interruptions in the printing of the print jobs in the first area 36.

The blocks illustrated in FIG. 2 may represent steps in a method and/or sections of code in the computer program 26. The illustration of a particular order to the blocks does not necessarily imply that there is a required or preferred order for the blocks and the order and arrangement of the blocks may be varied. Furthermore, it may be possible for some blocks to be omitted.

Although examples of the present invention have been described in the preceding paragraphs, it should be appreciated that modifications to the examples given can be made without departing from the scope of the invention as claimed. For example, the printer apparatus 10 may include a second image sensor that is positioned to overlay the third area 44 of the media 20. In these examples, the controller 12 may control the printer 14 to print target colors in the third area 44 (in addition to printing target colors in the second area 38) for performance of the method illustrated in FIG. 2. These examples provide an advantage in that calibration of the colors in a second print job may be performed in a shorter period of time. Alternatively, these examples may enable the colors of the two different print jobs to be calibrated while printing the current print job.

In some examples, the target color may not be printed in the second area 38 but may instead be printed in the first area 36 in between breaks in the printed content of the first print job. For example, where the media 20 is in sheet format, the target color may be printed in the top and/or bottom margins of the sheet. The controller 12 may control the actuator 18 to move the image sensor 16 to overlay the printed target colors in the first area 36 to obtain images.

In some examples, the controller 12 may determine whether the target color obtained in block 50 is a color within the first print job being printed. If the target color is being printed as part of the first print job, the controller 12 may control the actuator 18 to move the image sensor 16 to overlay the target color within the content of the first print job to obtain an image and then perform calibration of the target color as described above. In these examples, the controller 12 may not significantly vary the combination of printing materials that form the target color in order to ensure reasonable consistency of the printed content of the first print job.

Features described in the preceding description may be used in combinations other than the combinations explicitly described.

Although functions have been described with reference to certain features, those functions may be performable by other features whether described or not.

Although features have been described with reference to certain examples, those features may also be present in other examples whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method to calibrate a printer, the method comprising:
controlling printing of a first print job;
obtaining a target color from a second print job, the second print job to be printed subsequent to the first print job;
controlling printing of the target color obtained from the second print job while controlling printing of the first print job;
receiving an image of the printed target color; and
calibrating the printer using the printed target color in the received image and the target color obtained from the second print job.

2. A method as claimed in claim 1, wherein controlling printing of the first print job includes controlling printing of the first print job in a first area, and wherein controlling printing of the target color includes controlling printing of the target color in a second area adjacent to the first area.

3. A method as claimed in claim 2, wherein the second area is alongside the first area.

4. A method as claimed in claim 1, wherein calibrating the printer includes: determining an optimum combination of printing materials that provide the target color when printed; and storing data for the optimum combination of printing materials for the target color.

5. A method as claimed in claim 4, further comprising controlling printing of the second print job using the stored data for the target color.

6. A method as claimed in claim 1, further comprising:
obtaining a plurality of target colors from the second print job;
controlling printing of the plurality of target colors obtained from the second print job while controlling printing of the first print job;
receiving a plurality of images of the plurality of printed target colors; and
calibrating the printer using the plurality of printed target colors in the received images and the plurality of target colors obtained from the second print job.

7. A method as claimed in claim 1, wherein the method is performed automatically and without user intervention.

8. A method as claimed in claim 1, wherein calibrating the printer is performed while controlling printing of the first print job.

9. Printer apparatus comprising:
a controller to:
control printing of a first print job;
obtain a target color from a second print job, the second print job to be printed subsequent to the first print job;
control printing of the target color obtained from the second print job while controlling printing of the first print job;
receive an image of the printed target color; and
calibrate the printer using the printed target color in the received image and the target color obtained from the second print job.

10. Printer apparatus as claimed in claim 9, wherein the controller is arranged to control the printing of the first print job in a first area, and to control the printing of the target color in a second area adjacent to the first area.

11. Printer apparatus as claimed in claim 10, wherein the second area is alongside the first area.

12. Printer apparatus as claimed in claim 9, wherein the controller is arranged to: determine an optimum combination of printing materials that provide the target color when printed; and store data for the optimum combination of printing materials for the target color, to calibrate the printer.

13. Printer apparatus as claimed in claim 12, wherein the controller is arranged to control printing of the second print job using the stored data for the target color.

14. Printer apparatus as claimed in claim 9, wherein the controller is arranged to calibrate the printer while controlling printing of the first print job.

15. A non-transitory computer-readable storage medium encoded with instructions that, when performed by a processor, cause performance of:
controlling printing of a first print job;
obtaining a target color from a second print job, the second print job to be printed subsequent to the first print job;
controlling printing of the target color obtained from the second print job while controlling printing of the first print job;
receiving an image of the printed target color; and
calibrating the printer using the printed target color in the received image and the target color obtained from the second print job.

* * * * *